May 8, 1928.

F. DÖRING ET AL 1,668,710

CASING FOR LOADING COILS

Filed Sept. 24, 1926

Inventors: Fritz Doring
Otto Kalbitz
by E. V. Griggs
Attorney.

Patented May 8, 1928.

1,668,710

UNITED STATES PATENT OFFICE.

FRITZ DÖRING, OF FROHNAU, BERLIN, AND OTTO KALBITZ, OF FINKENKRUG, BERLIN, GERMANY, ASSIGNORS TO SIEMENS & HALSKE AKTIENGESELLSCHAFT, OF SIEMENSSTADT BEI BERLIN, A COMPANY OF GERMANY.

CASING FOR LOADING COILS.

Application filed September 24, 1926, Serial No. 137,444, and in Germany September 12, 1925.

This invention relates to a casing for loading coils.

Cases for loading coils known hitherto have been frequently constructed in such a manner that the coils or coil pillars were arranged on continuous spindles, for example screwed spindles, and were embedded in a cylindrical casing. This known arrangement has the disadvantage that when one or more coils become defective they cannot be replaced without the entire coil pillar being withdrawn from the case. This makes a severing of the entire coil pillar from the connecting cable necessary. Furthermore, after withdrawing the coil pillar, a defective coil can only be removed after all coils arranged above the defective coil, on the same spindle, have been removed.

According to this invention these disadvantages are overcome and a coil case particularly adapted for practical use is produced in which the coil pillars are attached to the cover of the casing. All coil pillars are preferably united to form a rigid system by means of transverse plates. A special spindle passed through the coil pillar can therefore be avoided since the coils are formed into a coil pillar by two or more longitudinal bars arranged at the outer circumference parallel to the axes of the coils.

Figure 1:
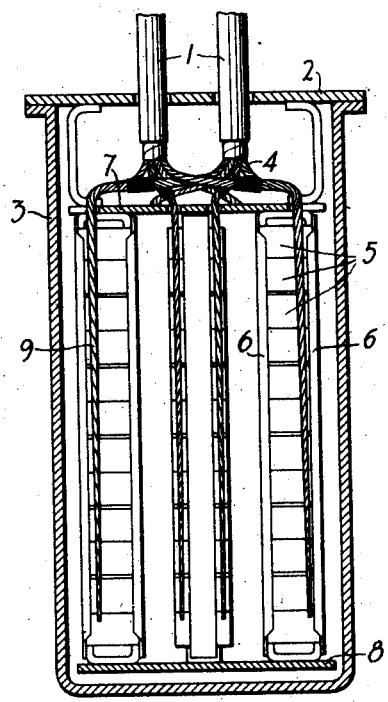

In the drawings two embodiments of the new arrangement are shown; in Fig. 1 the connecting cables (1) are passed through holes in the cover (2) into the interior of the casing (3). Below the cover (2) the cables are distributed into separate strands (4) which are spliced with the intermediate cables (9) coming from the coils (5).

The coils are attached to longitudinal bars (6) preferably by screws so that they can be separately detached. By means of the plates (7 and 8) and the bars (6) all coil pillars are combined in a rigid system.

Figure 2:
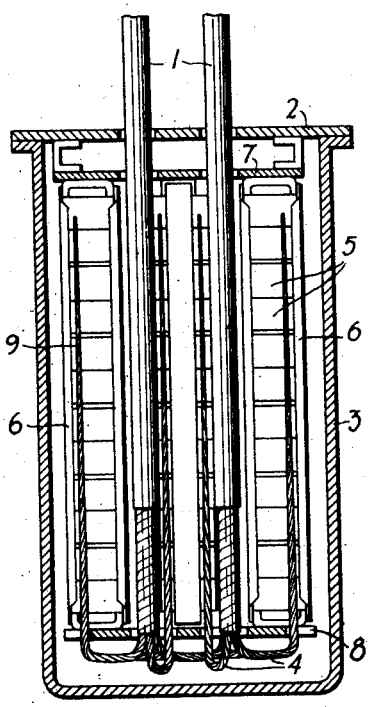

The arrangement shown in Fig. 2 differs from that of Fig. 1 chiefly only in this, that the cables (1) extend nearly to the bottom of the casing (3). Here they are then distributed into separate strands and without using a further intermediate cable are directly connected to the coils.

The changing of defective coils is exceedingly simple with this arrangement. After taking off the cover (2) with the block of coils attached to it, all coil pillars are perfectly free and remain in their respective positions, so that a disconnecting of the coil pillars from the connecting cable (1) is avoided. Then, from the coil pillar containing the faulty coil and possible after removing one of the longitudinal bars (6) the defective coil may be taken out and replaced by another.

The principal advantages of the new arrangement lie in this, that the leading-in cables (1) can be spliced with the coils (5) before the coil block is embedded in the case, and further, when removing faulty coils, they can be withdrawn and replaced without the intermediate cable being removed from the connecting cable before taking out the coil pillar, as is the case with known arrangements.

What is claimed is:

1. A casing for electromagnetic coils comprising a receptacle, a cover therefor, parallel members grouped in independent pairs and extending within said receptacle for supporting a plurality of electromagnetic coils between members of each of said pairs, and means for supporting said members in said receptacle from said cover.

2. A casing for electromagnetic coils according to claim 1 in which said supporting means constitutes the receptacle cover, said coils being removable therewith.

3. A casing for electromagnetic coils comprising a receptacle, parallel members extending within said receptacle, a plurality of electromagnetic coils arranged in a pillar adapted to be held between said members, said members partially surrounding said coils and being parallel to the axis of said pillar, and a suspension supporting member on said receptacle for said parallel members.

4. A casing for electromagnetic coils comprising a receptacle, a plurality of coils within said receptacle arranged in pillars, a plurality of brackets extending parallel to the axes of said coils, each pillar being held between a pair of brackets, and a suspension supporting means on said receptacle for said brackets.

5. A casing for electromagnetic coils comprising a receptacle, a cover therefor, a plurality of pairs of parallel members extending within said receptacle, unitary supporting means for said members attached to said cover, and a plurality of coils attached to and held between said members of each pair whereby any one of said coils is separately detachable from between the pair of parallel members supporting it.

6. A casing for electromagnetic coils comprising a receptacle, a cover therefor, a plurality of parallel members extending within said receptacle, and a plurality of coils held between and attached to said members, said members being attached to said cover whereby said cover, members and coils may be removed from said receptacle and said coils detached from said members individually.

In witness whereof, we hereunto subscribe our names this 3rd day of September A. D., 1926.

FRITZ DÖRING.
OTTO KALBITZ.